(12) United States Patent
Singh et al.

(10) Patent No.: US 10,171,368 B1
(45) Date of Patent: Jan. 1, 2019

(54) METHODS AND APPARATUS FOR IMPLEMENTING MULTIPLE LOOPBACK LINKS

(71) Applicant: Juniper Networks, Inc., Sunnyvale, CA (US)

(72) Inventors: Kamal Singh, Sunnyvale, CA (US); Sharath Kumar Kota Rathnamaiah, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 353 days.

(21) Appl. No.: 14/982,979

(22) Filed: Dec. 29, 2015

Related U.S. Application Data

(63) Continuation of application No. 13/932,323, filed on Jul. 1, 2013, now Pat. No. 9,246,820.

(51) Int. Cl.
*H04L 12/891* (2013.01)
*H04L 12/803* (2013.01)

(52) U.S. Cl.
CPC ............ *H04L 47/41* (2013.01); *H04L 47/125* (2013.01)

(58) Field of Classification Search
CPC ....... H04L 47/12; H04L 47/125; H04L 45/38; H04L 47/24; H04W 28/08
See application file for complete search history.

(56) References Cited

U.S. PATENT DOCUMENTS

| | | | |
|---|---|---|---|
| 2006/0198315 A1* | 9/2006 | Sasagawa | H04L 12/462 370/244 |
| 2006/0245436 A1* | 11/2006 | Sajassi | H04L 12/2898 370/395.53 |
| 2007/0133503 A1* | 6/2007 | Boustead | H04L 12/4633 370/351 |
| 2007/0280258 A1* | 12/2007 | Rajagopalan | H04L 45/245 370/395.3 |
| 2010/0161960 A1 | 6/2010 | Sadasivan | |
| 2011/0267950 A1* | 11/2011 | Solomon | H04L 45/04 370/235 |
| 2012/0082073 A1 | 4/2012 | Andreasen et al. | |
| 2013/0258963 A1* | 10/2013 | Mihaly | H04L 12/4633 370/329 |
| 2014/0211623 A1* | 7/2014 | Choi | H04L 47/125 370/235 |

* cited by examiner

*Primary Examiner* — Andrew W Chriss
*Assistant Examiner* — Atique Ahmed
(74) *Attorney, Agent, or Firm* — Cooley LLP

(57) ABSTRACT

In some embodiments, a non-transitory processor-readable medium stores code representing instructions to be executed by a processor that cause the processor to receive a data unit having a header portion. The code causes the processor to select a route based on the header portion and modify, based on the route being associated with a tunnel, the data unit to define a tunnel data unit including a tunnel header. The code causes the processor to select a loopback link from a set of loopback links of a loopback link aggregation group (LAG). The code further causes the processor to receive via the loopback link, the tunnel data unit and send the tunnel data unit via the tunnel based on the tunnel header.

20 Claims, 4 Drawing Sheets

300

| Destination Network Device Address 310 | Next Hop Network Device Address 320 | Encapsulate/ Decapsulate 330 |
|---|---|---|
| X | A | Yes |
| A | Z | No |
| H | I | No |

FIG. 3

METHODS AND APPARATUS FOR IMPLEMENTING MULTIPLE LOOPBACK LINKS

CROSS REFERENCE TO RELATED APPLICATIONS

This application is a continuation of U.S. patent application Ser. No. 13/932,323, now U.S. Pat. No. 9,246,820, filed Jul. 1, 2013, entitled "Method and Apparatus for Implementing Multiple Loopback Links," which is incorporated herein by reference in its entirety.

BACKGROUND

Some embodiments described herein relate generally to methods and apparatus to configure a set or a group of loopback ports in a network device and associate a given tunnel to these loopback ports.

Typically, Generic Routing Encapsulation (GRE) tunneling involves a two-pass mechanism that supports quality of service (QoS) and firewalls on both passenger internet protocol (IP) and delivery GRE-IP header. In GRE tunneling, all the ingress/egress traffic for all GRE tunnels is typically redirected to a loopback port in a network device. In the first pass, on traffic ingressing on a GRE tunnel, the tunnel header of each data unit is removed (decapsulated) and the incoming GRE tunnel is identified; then, that data unit is looped back via a designated loopback port. In the second pass, each data unit is further processed in the network device. Similarly, in the first pass, for data traffic egressing the GRE tunnel, each data unit is encapsulated by a tunnel header and that data unit is looped back. In the second pass, each data unit is routed based on the tunnel destination.

In this known GRE tunneling approach, if the loopback port or link becomes deactivated for any reason (e.g., line card on which the loopback port resides powers off or becomes deactivated), the GRE tunnels using this loopback port also become deactivated until the user configuration changes or the loopback port recovers. Additionally, depending on the data traffic dynamics, the total tunnel traffic ingressing/egressing a given loopback port can exceed the loopback port bandwidth.

Accordingly, a need exists for methods and apparatus to configure a set or a group of loopback ports in a network device and associate a given GRE tunnel to these loopback ports. Hence, if any of the loopback ports or links becomes deactivated, the data traffic can be automatically re-routed to the other active loopback ports or links and the data traffic can be also be appropriately load balanced across the set of loopback ports.

SUMMARY

In some embodiments, a non-transitory processor-readable medium stores code representing instructions to be executed by a processor that cause the processor to receive a data unit having a header portion. The code causes the processor to select a route based on the header portion and modify, based on the route being associated with a tunnel, the data unit to define a tunnel data unit including a tunnel header. The code causes the processor to select a loopback link from a set of loopback links of a loopback link aggregation group (LAG). The code further causes the processor to receive via the loopback link, the tunnel data unit and send the tunnel data unit via the tunnel based on the tunnel header.

BRIEF DESCRIPTION OF THE DRAWINGS

FIG. 3 is an illustration of a routing table associated with the route module of a network device, according to an embodiment.

DETAILED DESCRIPTION

In some embodiments, a non-transitory processor-readable medium stores code representing instructions to be executed by a processor that cause the processor to receive at a route module of a network device, a data unit having a header portion. The code causes the processor to select a route based on the header portion and modify, based on the route being associated with a tunnel, the data unit to define a tunnel data unit including a tunnel header. The code causes the processor to select a loopback link from a set of loopback links of a loopback link aggregation group (LAG). The code further causes the processor to receive, at the route module and via the loopback link, the tunnel data unit and send the tunnel data unit via the tunnel based on the tunnel header.

In some embodiments, an apparatus includes a route module implemented in at least one of a memory or a processing device that is configured to receive a data unit having a header portion. The apparatus includes an encapsulation module operatively coupled to the route module, where the encapsulation module can receive the data unit from the route module and add a tunnel header to the data unit to define a tunnel data unit. The apparatus includes a loopback selection module that is operatively coupled to the encapsulation module. The loopback selection module can select a loopback link from a set of loopback links of a loopback link aggregation group (LAG) that operatively couples the loopback selection module with the route module. The route module can receive the tunnel data unit via the loopback link and send the tunnel data unit via the tunnel based on the tunnel header.

In some embodiments, an apparatus includes a route module implemented in at least one of a memory or a processing device. The route module is configured to receive, from a tunnel, a tunnel data unit having a tunnel header. The apparatus includes a decapsulation module operatively coupled to the route module where the decapsulation module can receive the tunnel data unit from the route module based on the tunnel header. The decapsulation module can remove the tunnel header from the tunnel data unit to define a data unit. The apparatus also includes a loopback selection module operatively coupled to the decapsulation module that can receive a data unit from the decapsulation module. The loopback selection module can select a loopback link from a set of loopback links of a loopback link aggregation group (LAG) that operatively couples the loopback selection module with the route module. The route module is configured to receive the data unit via the loopback link and send the data unit via a link based on a header portion of the data unit.

As used in this specification, the singular forms "a," "an" and "the" include plural referents unless the context clearly dictates otherwise. Thus, for example, the term "a network device" is intended to mean a single network device or multiple network devices.

Figure 1:
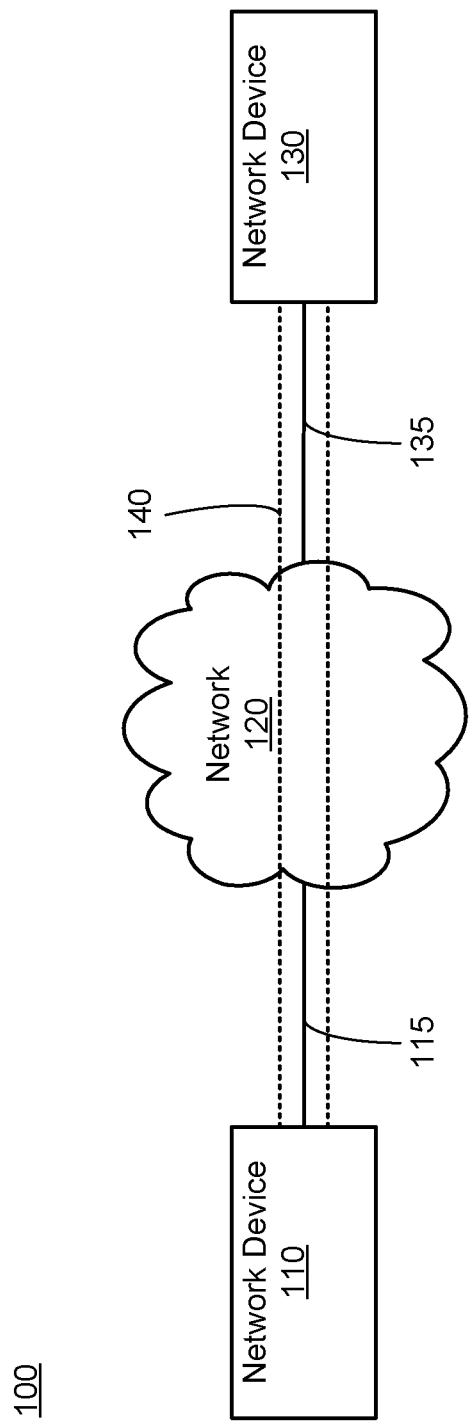
FIG. 1 is a schematic illustration of a system for implementing a tunnel based communication session between network devices, according to an embodiment.

FIG. 1 is a schematic illustration of a system 100 for implementing a tunnel based communication session between network devices in a computer network, according to an embodiment. The system 100 includes network devices 110 and 130, a network 120, a physical link 115 that connects the network device 110 to the network 120, a physical link 135 that connects the network device 130 to the network 120, and a tunnel 140 that connects the network device 110 to the network device 130 via the network 120. The network 120 can be any type of network (e.g., a local area network (LAN), a wide area network (WAN), a virtual network, and a telecommunications network) implemented as a wired network and/or wireless network. In some instances, the network device 110 and/or 130 can be, for example, a server or a host machine such as for example, a web server, an application server, a proxy server, a telnet server, and/or a file transfer protocol (FTP) server. In other instances, the network device 110 and/or 130 can also be a personal computing device such as a desktop computer or a laptop computer.

The physical links 115 and 135 can allow the transmission of data units and/or tunnel data units from the network devices 110 and/or 130 via the network 120. The physical links 115 and 135 can implement a wired connection such as, for example, twisted-pair electrical signaling via electrical cables, fiber-optic signaling via fiber-optic cables, and/or the like. The tunnel 140 can be associated with a tunnel module (not shown in FIG. 1) in the network devices 110 and/or 130 that can execute application processes and/or other modules, instructions, processes and/or functions associated with establishing and maintaining a tunnel such as, for example, a Generic Routing Encapsulation (GRE) tunnel, a Multiprotocol Label Switching (MPLS) tunnel, and/or the like. For example, one such tunnel module can be configured to encapsulate outgoing data units and another such tunnel module can be configured to decapsulate incoming data units passing through the tunnel 140 defined between the network devices 110 and/or 130 and the network 120.

The network device 110 and/or 130 can receive a data unit that includes a header portion from, for example, another network device or a network node such as an aggregation network node or an access network node (not shown in FIG. 1). The network device 110 and/or 130 can select a route based on the header portion of the data unit. In some instances, if the data unit includes a tunnel header, the network devices 110 and/or 130 can send the (tunnel) data unit via a link associated with the appropriate tunnel. In other instances, the data unit may not include a tunnel header but the route information included in the header portion of the data unit may be a tunnel route. In such instances, the network devices 110 and/or 130 can encapsulate the data unit with a tunnel header to define a tunnel data unit (tunnel data units can be defined as data units that are to be transported via a tunnel to the destination network device and that are encapsulated with a tunnel header) and send the tunnel data unit via a route that is based on the appropriate tunnel 140.

The network device 110 and/or 130 can also select a loopback link from a set of loopback links of a loopback link aggregation group (LAG). The loopback link is selected from the set of loopback links based on, for example, a hash function or a lookup table associated with the loopback LAG and the header portion of the tunnel data unit. The network device 110 and/or 130 can receive, at a route module (within the network device as described in greater detail in FIG. 2) and via the loopback link, the tunnel data unit and can send the tunnel data unit via the tunnel 140 based on the Internet Protocol (IP) address or other identifiers associated with the tunnel 140 being included within the tunnel header.

The tunnel based communication session between network devices shown in FIG. 1 can allow a set or group of loopback ports to be configured in a network device and a given tunnel to be associated with this set (or group) of loopback ports. The loopback port group can be configured according to the LAG. This approach can scale appropriately with various combinations of GRE tunnels and loopback ports. Hence, if any of the loopback ports or links becomes deactivated, the data traffic can be automatically re-routed to the other active loopback ports or links; by proper configuration of LAG hashing, the data traffic can be also be appropriately load balanced.

Figure 2:
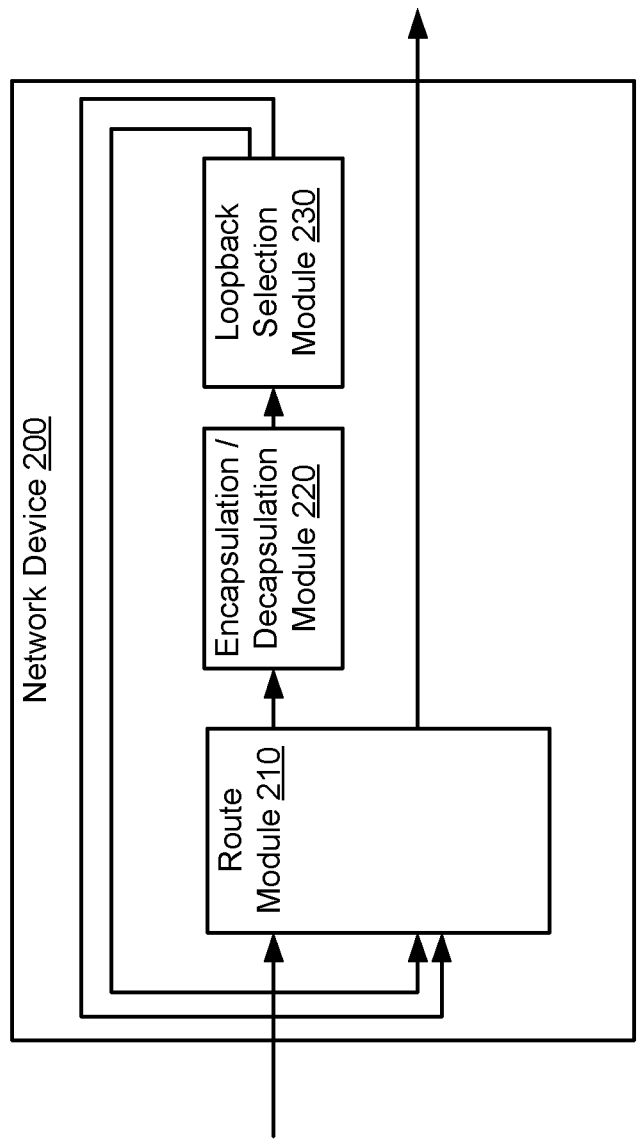
FIG. 2 is a system block diagram of a network device, according to an embodiment.

FIG. 2 is a system block diagram of a network device 200, according to an embodiment. Similar to network device 110 and network device 130 shown in FIG. 1, network device 200 can be any device that can send and/or receive data units via a network. For example, network device 200 can be a server or a host machine such as a web server, an application server, a proxy server, a telnet server, and/or a file transfer protocol (FTP) server, or a personal computing device such as a desktop computer or a laptop computer. As shown in FIG. 2, the network device 200 includes a route module 210, an encapsulation/decapsulation module 220 and a loopback selection module 230.

The route module 210 can be hardware module or a software module (stored in the memory and/or executed in the processor of the network device) that can contain a routing table (explained in detail in FIG. 3) that can list the routes to particular network destinations for incoming and/or outgoing data units. The routing table can also store route information (such as IP or MAC addresses of network nodes, and/or network devices, and/or interfaces) on directly connected and remote networks. Additionally, the routing table can also contain the address of the "next hop" network device that indicates an intermediate destination network device along a specified path to the destination network device or destination network node. In some instances, the route module 210 can receive a data unit having a header portion. The route module 210 can select a route based on the header portion of the data unit. The route module 210 can send the data unit to the encapsulation/decapsulation module 220 module based on the route. In other instances, the route module 210 can receive a tunnel data unit via the loopback link from a set of loopback links of a loopback LAG. The route module 210 can send the tunnel data unit via the tunnel based on the tunnel header. The route module 210 can also send the tunnel data unit to the encapsulation/decapsulation module 220 (for decapsulation of the tunnel header) in response to determining that the route module 210 is associated with an end portion of the tunnel.

The encapsulation/decapsulation module 220 can be a hardware module or a software module (stored in the memory and/or executed in the processor of the network device). In some instances, the encapsulation/decapsulation module 220 can encapsulate a data unit according to a specific tunneling protocol to define a tunnel data unit. In other instances, the encapsulation/decapsulation module 220 can decapsulate a tunnel data unit according to a specific tunneling protocol to define a data unit. Specifically, upon receiving from the route module 210, a data unit that includes a tunnel route in the header portion, the encapsulation/decapsulation module 220 can encapsulate the data unit (e.g., add a tunnel header portion, a footer portion, and/or modify any other identifiers included within the data unit) according to a specific tunneling protocol. The encapsulation/decapsulation module 220 can perform operations to encapsulate the data unit with the appropriate tunnel header based on the destination IP address in the header portion of the data unit to define a tunnel data unit. The encapsulated tunnel data unit is then sent to the loopback selection module 230 that selects an appropriate loopback link from a set of loopback links of a loopback LAG. If it is determined that the network device 200 is associated with an end portion of a tunnel for a given tunnel data unit received by the encapsulation/decapsulation module 220, the encapsulation/decapsulation module 220 can perform the necessary operations to decapsulate the tunnel data unit (e.g., remove a header portion, a footer portion, and/or modify any other identifiers included within the packet) according to a specific tunneling protocol to define a data unit. The decapsulated data unit is then sent to the loopback selection module 230 that selects an appropriate loopback link from a set of loopback links of a loopback LAG.

The loopback selection module 230 can be hardware module or a software module (stored in the memory and/or executed in the processor of the network device). The loopback selection module 230 is operatively coupled to the encapsulation/decapsulation module 220 and the route module 210. In some instances, the loopback selection module 230 can receive a (decapsulated) data unit from the encapsulation/decapsulation module 220. In such instances, the loopback selection module 230 can select a loopback link from a set of loopback links of a loopback LAG and send the data unit to the route module 210 via the selected loopback link. The route module 210 can receive the data unit via the selected loopback link and can send the data unit via a link based on a header portion of the data unit. In other instances, the loopback selection module 230 can receive (an encapsulated) tunnel data unit from the encapsulation/decapsulation module 220. In such instances, the loopback selection module 230 can select a loopback link from a set of loopback links of a loopback LAG and send the tunnel data unit to the route module 210 via the selected loopback link. Note that in some embodiments, the loopback link associated with the (decapsulated) data unit can be the same as the loopback link associated with the tunnel data unit. In other embodiments, the loopback link associated with the (decapsulated) data unit can be different from the loopback link associated with the tunnel data unit. The loopback selection module 230 can select the loopback link from the set of loopback links based on a hash function associated with the loopback LAG and the header portion of the data unit. The hash function can be any method or subroutine that can map a large data set of variable length (e.g., destination IP address in the header portion of the data unit) to smaller data sets of a fixed length (e.g., loopback link number). The values returned by a hash function can be referred to as hash values, hash codes, hash sums, checksums or hashes. The hash functions can be used in hash tables that can be stored in, for example, the loopback selection module 230, to efficiently locate a data record (e.g., loopback link number) given the corresponding search key (e.g., destination IP address in the header portion of the data unit). In some configurations, the loopback LAG can be implemented by physical loopback links and/or loopback ports that are external to the network device. In other configurations, the loopback LAG can be implemented by virtual loopback links and/or loopback ports that are internal to (i.e., part of the) network device.

In some instances, the loopback selection module 230 can also include or be operatively coupled to a load balancing module (not shown in FIG. 2). In such instances, the load balancing module can receive, for example, a periodic or repeated indication of the current bandwidth used and bandwidth available to each active loopback link from the set of loopback links of the LAG. The load balancing module can define a signal that can be sent to the loopback selection module 230, indicating or representing the bandwidth availability of each loopback link from the set of loopback links of the loopback LAG. The bandwidth availability information together with the output of the hash function associated with the loopback LAG and the header portion of the data unit can be used by the loopback selection module 230 to select the appropriate loopback link from the set of loopback links of the loopback LAG for either a tunnel data unit or a data unit. As a result of this loopback link selection, the data traffic can be load balanced across each active loopback link from the set of loopback links of the loopback LAG.

FIG. 3 is an illustration of a routing table 300 associated with the route module of a network device, according to an embodiment. For example, the routing table 300 can be used with the route module 210 of the network device 200 of FIG. 2. The routing table 300 can contain the destination network device address 310 for the data units and tunnel data units ingressing and egressing through the network device such as, for example, a destination network device IP address, a destination network device MAC address, a destination network device identifier, and/or the like. The routing table 300 can also contain the next hop network device address 320 in different routes for data units and tunnel data units ingressing and egressing through the network device such as, for example, a next hop network device IP address, a next hop network device MAC address, a next hop network device identifier, and/or the like. The next hop network device address 320 is the address of the next network device or network node in the subsequent physical hop link on the way to the destination network device specified by a data unit or a tunnel data unit. In some instances, the routing table 300 can include both the IP addresses and MAC addresses of the destination network device and the next hop network device. In other instances, the routing table 300 can only include the IP addresses of the destination network device and the next hop network device. Additionally, the routing table 300 can also include information associated with encapsulation and/or decapsulation 330 of different data units and/or tunnel data units ingressing and egressing through the network device. The routing table 300 is a recursive table as the contents of the routing table 300 can be updated periodically or substantially periodically to contain the most current state of the different data units and tunnel data units ingressing and egressing through the network device.

For example, in some instances, when data units are egressing a network device, during the first pass, a data unit can have a destination network device address 310 of "X" and the next hop network device address 320 of "A" as shown in FIG. 3. If the route associated with the destination network device address 310 includes a tunnel, the routing table 300 can include information that be accessed (by the route module and/or the encapsulation/decapculation module) to implement the encapsulation of the data unit (at the encapsulation/decapsulation module as shown in FIG. 2). During the second pass (loopback stage), the next hop network device address 320 associated with the tunnel is incorporated or included within the tunnel header of the tunnel data unit (the data unit from the first pass is modified by the encapsulation/decapsulation module to include a tunnel header). The tunnel data unit need not undergo any further encapsulation steps during the second pass and can be sent by the routing module via an appropriate tunnel to the next hop network device in the tunnel (e.g., with an IP address of "Z" as shown in FIG. 3). In other instances, a data unit can have a destination network device address 310 of "H" and the next hop network device address 320 of "I" as shown in FIG. 3 (third row). In such instances, the route associated with the destination network device address 310 may not include a tunnel; the data unit need not undergo an encapsulation step and the data unit can be sent by the route module to the next hop network device. In yet other instances (not shown in FIG. 3), when a tunnel data unit is ingressing the network device, the routing table 300 can contain information that can be accessed by the routing module and/or the encapsulation/decapsulation module to decapsulate the data unit (if the network device is the end device in the tunnel) and the newly decapsulated data unit can be processed by the network device.

Figure 4:
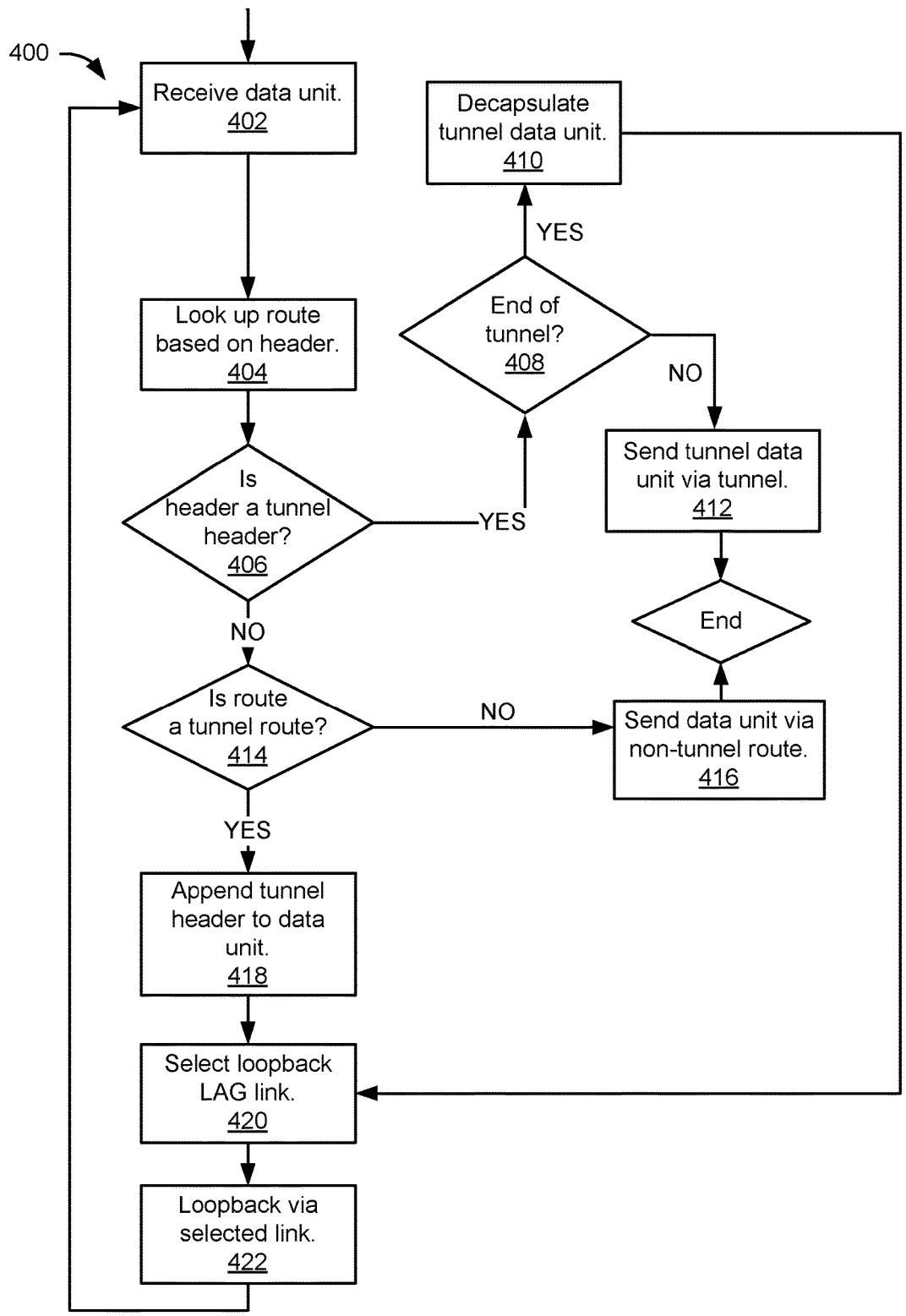
FIG. 4 is a flowchart illustrating a method for routing a data unit that is received by a network device, according to an embodiment.

FIG. 4 is a flowchart illustrating a method for routing a data unit that is received by a network device, according to an embodiment. The method 400 includes receiving at, for example, a network device, a data unit (or tunnel data unit), at 402. As described above, in some instances, the network device can be, a server or a host machine such as, for example, a web server, an application server, a proxy server, a telnet server, and/or a file transfer protocol (FTP) server. In other instances, the network device can also be a personal computing device such as a desktop computer or a laptop computer. As described above, in some instances, a data unit can be received at, for example, the route module of the network device from, for example, another network device or a network node such as an aggregation network node or an access network node. In other instances, a tunnel data unit can be received at, for example, the route module of the network device from, for example, a loopback link from a set of loopback links of a loopback LAG in the same network device.

At 404, the route module of the network device can look up the route for the received data unit (or tunnel data unit) based on the destination network device IP address contained within the header portion of the data unit. As described above, the route module of the network device can contain a routing table that can list the routes to particular network destination network devices for incoming and/or outgoing data units or tunnel data units. As described above, the routing table can also store route information (such as IP or MAC addresses of network nodes, network devices, and/or interfaces) on directly-connected networks and/or remote networks. Additionally, the routing table can also contain "next hop" network device associations indicating the IP address of an intermediate network device along a specified path to the destination network device or network node.

At 406, in some instances, the header of the data unit (or tunnel data unit) can be determined to be a tunnel header. The route module can read the header portion of the received data unit (or tunnel data unit) to determine the presence of a tunnel header. In such instances, if the data unit (or tunnel data unit) was received from a loopback link from a set of loopback links of a loopback LAG in the same network device, and the data unit is determined to have a tunnel header, then the route module can determine whether the network device is an end network device in the tunnel, at 408. As described above, the route module can determine the details of the tunnel by the information included in the tunnel header. In some instances, if it is determined that the network device is an end device in the tunnel, the tunnel data unit can be decapsulated, at 410. As described above, the tunnel data unit can be sent from the route module to the encapsulation/decapsulation module for decapsulation of the tunnel header and thereby a data unit can then be defined at the encapsulation/decapsulation module. After decapsulation of the tunnel data unit, the data unit can be sent by, for example, the encapsulation/decapsulation module to, for example, the loopback selection module, at 420. The loopback selection module of the network device can select a loopback link from a set of loopback links of a loopback LAG. As described above, the loopback selection module can select the loopback link from the set of loopback links based on, for example, a hash function or look-up table associated with the loopback LAG and the destination IP address within the header portion of the data unit.

In other instances, if the network device is not determined to be the end device in the tunnel, the route module can send the tunnel data unit via a link associated with the appropriate tunnel, at 412. As described above, if the network device is an intermediate or "next hop" network device or network node along the tunnel for the tunnel data unit, the route module can send the tunnel data unit to the subsequent "next-hop" network device or network node along the tunnel via the appropriate link. The subsequent "next-hop" network device or network node can be the final destination network device or network node for the tunnel data unit or another intermediate "next-hop" network device or network node along the tunnel.

If the header of the data unit (or tunnel data unit) is not a tunnel header, then the route module of the network device can determine whether the route information present within the header of the data unit is a tunnel route, at 414. As described above, the route module of the network device can contain a routing table that can list the routes to particular network destinations for incoming and/or outgoing data units. Additionally, the routing table can also contain "next hop" associations indicating an intermediate network device or network node along a specified path to the destination network device or network node. If the route for the data unit is not determined to be a tunnel route, and the data unit has been received from a loopback link from a set of loopback links of a loopback LAG in the same network device, the data unit is sent via a non-tunnel route to the final destination network device or network node or the subsequent "next-hop" network device or network node on the path towards the destination network device, at 416.

At 418, if the route module of the network device can determine that the route information present in the header of the data unit is a tunnel route, a tunnel header is appended to the data unit to define a tunnel data unit. As described above, upon determining that the route information present in the header of the data unit is a tunnel route, the route module can send the data packet to, for example, the encapsulation/decapsulation module. The encapsulation/decapsulation module can encapsulate the data unit (e.g., add a tunnel header portion, a footer portion, and/or modify any other identifiers included within the data unit) according to a specific tunneling protocol to define a tunnel data unit. After the encapsulation of the tunnel data unit, the encapsulation/decapsulation module can send the tunnel data unit to, for example, the loopback selection module.

At 420, an appropriate loopback link from the set of loopback links of the loopback LAG is selected for the tunnel data unit. As described above, the loopback selection module of the network device can select a loopback link from a set of loopback links of a loopback LAG. The loopback selection module can select the loopback link from the set of loopback links based on, for example a hash function or a look-up table associated with the loopback LAG and the destination IP address within the header portion of the tunnel data unit. Additionally, the loopback link can also be selected based on the bandwidth availability of the active loopback links in the loopback LAG so that the data traffic is load balanced across all the active loopbacks links in the loopback LAG. At 422, the tunnel data unit is looped back to, for example, the route module of the network device via the selected loopback link from a set of loopback links of a loopback LAG.

The tunnel based communication session between network devices shown and described in detail in FIGS. 1-4 is not limited to GRE tunnels and can be extended to network systems that involve network devices with loopback link mechanisms and that employ a variety of other tunneling protocols such as, for example, an Ethernet-over-layer-3 tunnel such as a Control and Provisioning of Wireless Access Points (CAPWAP) tunneling protocol, a Multiprotocol Label Switching (MPLS) tunneling protocol, and/or the like. The proposed loopback LAG technique within network devices can provide link redundancy and increase in total link bandwidth (due to multiple loopback links being included in the loopback link LAG, where multiple physical links or ports are implementing a single logical link). Hence, this technique can provide a user such as, for example, a network administrator the ability to control the configuration of the loopback LAG. This can allow the network administrator to control the level of redundancy increase and increase available bandwidth. Additionally, this technique can also scale appropriately with various combinations of tunnels and loopback links or ports. Hence, as described above, if any of the loopback ports or links becomes deactivated, the data traffic can be automatically re-routed to the other active loopback ports or links and by proper configuration of LAG hashing, the data traffic can be also be appropriately load balanced.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
   a memory; and
   a processor operatively coupled to the memory implementing a route module, an encapsulation module operatively coupled to the route module, and a loopback selection module operatively coupled to the route module and the encapsulation module,
   the route module configured to receive a data unit having a header portion,
   the encapsulation module configured to receive the data unit from the route module and to append a tunnel header to the data unit to define a tunnel data unit,
   the loopback selection module configured to receive the tunnel data unit from the encapsulation module and receive a signal representing bandwidth availability of each loopback link from a plurality of loopback links of a loopback link aggregation group (LAG),
   the loopback selection module configured to select a loopback link from the plurality of loopback links of the loopback LAG based on the tunnel header and the bandwidth availability such that data traffic can be load balanced across each loopback link from the plurality of loopback links of the loopback LAG,
   the route module configured to receive the tunnel data unit from the loopback selection module via the loopback link and send the tunnel data unit via a tunnel based on the tunnel header.

2. The apparatus of claim 1, wherein the tunnel is a Generic Routing Encapsulation (GRE) tunnel.

3. The apparatus of claim 1, wherein:
   the processor implements a load balancing module operatively coupled to the loopback selection module,
   the load balancing module send, to the loopback selection module, the signal representing the bandwidth availability of each loopback link from the plurality of loopback links.

4. The apparatus of claim 1, wherein the loopback selection module is configured to select the loopback link from the plurality of loopback links based on a hash function associated with the loopback LAG.

5. The apparatus of claim 1, wherein the route module is configured to send the tunnel data unit to a decapsulation module in response to determining that the route module is associated with an end portion of the tunnel.

6. The apparatus of claim 1, wherein the loopback selection module is configured to select the loopback link from the plurality of loopback links based on the header portion.

7. The apparatus of claim 1, wherein the route module is configured to select a route based on a destination Internet Protocol (IP) address associated with the tunnel being within the header portion.

8. The apparatus of claim 1, wherein the route module is configured to send the tunnel data unit via the tunnel based on an Internet Protocol (IP) address associated with the tunnel within the tunnel header.

9. An apparatus, comprising:
a first network device having a memory and a processor operatively coupled to the memory;
the processor implementing a route module, a decapsulation module operatively coupled to the route module, and a loopback selection module operatively coupled to the route module and the decapsulation module,
the route module configured to receive a tunnel data unit, at the first network device, via a first loopback link from a plurality of loopback links of a loopback link aggregation group (LAG) associated with the first network device, the tunnel data unit including a tunnel header,
the decapsulation module configured to receive the tunnel data unit from the route module based on the tunnel header and to modify the tunnel data unit to form a data unit,
the loopback selection module configured to receive the data unit from the decapsulation module and to receive a signal representing bandwidth availability of at least one loopback link from the plurality of loopback links of the loopback LAG,
the loopback selection module configured to select a second loopback link from the plurality of loopback links of the loopback LAG based on the bandwidth availability of the at least one loopback link, the first loopback link being different from the second loopback link,
the route module configured to receive the data unit via the second loopback link and to send the data unit to a second network device based on a header portion of the data unit.

10. The apparatus of claim 9, wherein the loopback selection module is configured to select the second loopback link from the plurality of loopback links based on a hash function associated with the loopback LAG.

11. The apparatus of claim 9, wherein the signal represents bandwidth availability of each loopback link from the plurality of loopback links of the loopback LAG,
the loopback selection module is configured to select the second loopback link from the plurality of loopback links of the loopback LAG based on the bandwidth availability such that data traffic can be load balanced across each loopback link from the plurality of loopback links of the loopback LAG.

12. The apparatus of claim 9, wherein the route module is configured to send the tunnel data unit to the decapsulation module in response to determining that the route module is associated with an end portion of a tunnel.

13. An apparatus, comprising:
a processor; and
a memory operatively coupled to the processor, the memory storing code representing instructions to be executed by the processor, the code comprising code to cause the processor to:
receive, at a network device, a data unit having a header portion;
determine a route based on the header portion;
when the header portion is not a tunnel header and the route is a tunnel route,
(1) add a tunnel header to the data unit to define a tunnel data unit,
(2) receive a signal representing bandwidth availability of at least one loopback link from a plurality of loopback links of a loopback link aggregation group (LAG),
(3) select a loopback link from the plurality of loopback links of the LAG based on the bandwidth availability of the at least one loopback link,
(4) transmit, via the loopback link, the tunnel data unit, and
(5) send the tunnel data unit via a tunnel based on the tunnel header; and
when the header portion is not a tunnel header and the route is not tunnel route, send the data unit via a non-tunnel route based on the header portion.

14. The apparatus of claim 13, wherein the loopback link is a first loopback link, the code comprising code to further cause the processor to:
when the header portion is a tunnel header,
(1) remove the tunnel header from the data unit to form a decapsulated data unit,
(2) select a second loopback link from the plurality of loopback links,
(3) transmit, via the second loopback link, the decapsulated data unit, and
(4) send the decapsulated data unit via a link based on the header portion.

15. The apparatus of claim 13, wherein the tunnel is a Generic Routing Encapsulation (GRE) tunnel.

16. The apparatus of claim 13, wherein the code to cause the processor to select the loopback link includes code to cause the processor to select the loopback link from the plurality of loopback links based on a hash function associated with the loopback LAG.

17. The apparatus of claim 13, wherein the code to cause the processor to select the loopback link includes code to cause the processor to select the loopback link from the plurality of loopback links based on the header portion.

18. The apparatus of claim 13, wherein the loopback link is a first loopback link, a second loopback link from the plurality of loopback links providing redundancy to the first loopback link.

19. The apparatus of claim 13, wherein the code to cause the processor to send includes code to cause the processor to send the tunnel data unit via the tunnel based on an Internet Protocol (IP) address associated with the tunnel being within the tunnel header.

20. The apparatus of claim 13, wherein the signal represents bandwidth availability of each loopback link from the plurality of loopback links of the loopback LAG,
the code to cause the processor to select the loopback link includes code to cause the processor to select the loopback link from the plurality of loopback links of the loopback LAG based on the bandwidth availability such that data traffic can be load balanced across each loopback link from the plurality of loopback links of the loopback LAG.

* * * * *